United States Patent [19]

Schiel et al.

[11] Patent Number: 4,598,448
[45] Date of Patent: Jul. 8, 1986

[54] PRESS ROLLER WITH ADJUSTABLE BOWING MEANS

[75] Inventors: Christian Schiel; Georg Zurn, both of Heidenheim, Fed. Rep. of Germany

[73] Assignee: J. M. Voith GmbH, Heidenheim, Fed. Rep. of Germany

[21] Appl. No.: 583,246

[22] Filed: Feb. 24, 1984

[30] Foreign Application Priority Data

Feb. 26, 1983 [DE] Fed. Rep. of Germany ....... 3306838

[51] Int. Cl.$^4$ ............................................. B21B 13/02
[52] U.S. Cl. ........................... 29/116 AD; 100/162 B
[58] Field of Search ...... 29/116 AD, 116 R, 113 AD, 29/113 R, 125; 100/162 B; 267/118, 127, 8 R, 136

[56] References Cited

U.S. PATENT DOCUMENTS 3,225,418  12/1965  Fara ............................... 29/113 AD
4,307,501  12/1981  Ahrweiler ..................... 29/113 AD

FOREIGN PATENT DOCUMENTS 3119387  11/1982  Fed. Rep. of Germany ........ 29/110
1183828   7/1959  France ............................... 267/127

Primary Examiner—Mark Rosenbaum
Assistant Examiner—John T. Burtch
Attorney, Agent, or Firm—Grimes & Battersby

[57] ABSTRACT

A press roller is provided which permits adjustable bowing under load. The press roller has a hollow, rotatable roller casing through which a stationary cross head extends. A semi-circular pressure chamber is formed between the cross head and the roller casing. In this chamber, two annular pistons are provided which rest on one end surface of the inner surface of the roller casing and are guided in a sealing manner in recesses in the cross head. To prevent bending oscillations by the cross head, the annular pistons enclose substantially rigid fluid cushions which are isolated from one another.

16 Claims, 4 Drawing Figures

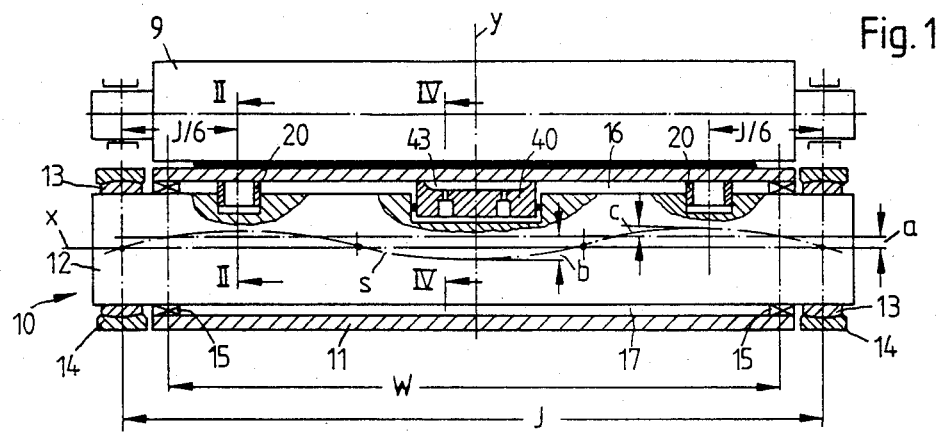
Fig. 1
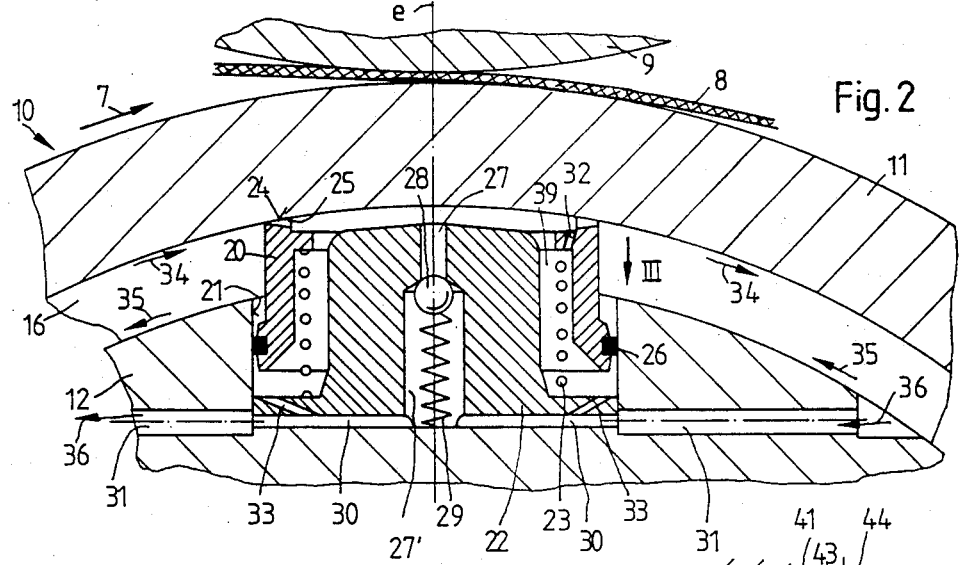
Fig. 2
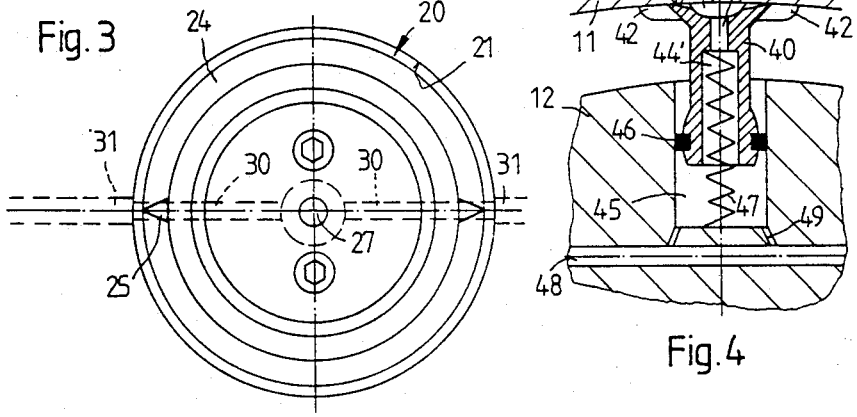
Fig. 3
Fig. 4

PRESS ROLLER WITH ADJUSTABLE BOWING MEANS

BACKGROUND OF THE INVENTION

The present invention relates generally to a press roller and, more particularly, to a press roller with adjustable bowing means.

Press rollers of the type which permit adjustable bowing under load are known in the prior art. See, for example, GB-PS No. 1,255,453. In particular, it is known to use press rollers of the type which include a bowing support or "cross head" which extends through a hollow, rotatable roller casing. In order to transmit the pressing force from the roller casing to the cross head, a pressure chamber into which pressurized fluid can be introduced, is utilized. The chamber faces towards the counter-roller with the aid of sealing strips.

When operating such press rollers, particularly wet presses in paper making machines, oftentimes the rollers would begin to oscillate due to reasons heretofore unexplained.

It has been found that such prior oscillation problems were caused by the combination of two oscillation systems both of which display at approximately the same frequency. One of the oscillating systems was the cross head which tends to undergo a bending oscillation, normally in the form of the second harmonic oscillation (i.e., there are four node points, two of which are in the cross head bearings and two of which are at the one-third points lying in between). The second oscillation system is a so-called contact oscillation of the press roller casing relative to its counter-roller. The occurence of this type of oscillation is obviously enhanced by the compressible felt strip running between the two rollers.

If the roller casing of the press roller is supported on the cross head at both ends via bearings and if, as in the above-mentioned known design, the distance between the roller casing bearings is less than the distance between the cross head bearings, there becomes a danger of a direct link-up between the said two oscillation systems.

Against the foregoing background, it is a primary object of the present invention to provide a roller which eliminates or at least minimizes these oscillations as much as possible.

SUMMARY OF THE INVENTION

Based upon the realization described above, in order to achieve the above-mentioned object, it is proposed to provide a most rigid possible fluid cushion in the annular chamber situated between the cross head and the roller casing (or a plurality of such fluid cushions). For this purposes, at least one piston is used which passes through the cross head in a sealing manner, and rests constantly against the inner surface of the roller casing. It is known to provide pistons in press rollers of the type discussed above. See, for example, U.S. Pat. No. 4,307,501 in which annular pistons are used. In that patent, the annular pistons serve an entirely different purpose. They are intended to separate off zones in the annular chamber in which a lower pressure can be set than the pressure prevailing in the annular chamber. In this way, it is hoped to also influence the pressing force along the pressure line. To this end and in this case, fluid pipelines pass through the cross head from the inner chambers in the annular pistons to the outside.

In a further press roller, there are annular pistons with their inner chambers connected to a pressure medium source. See, for example, U.S. Pat. No. 4,319,390 wherein the fluid cushions thus formed are the only elements for transmitting the pressing force from the roller casing to the cross head. The annular chamber situated between the cross head and the roller casing is pressure-free outside the annular pistons.

According to the invention, provision is made for the fluid cushion or cushions to be substantially isolated, i.e., they have no connections to the outside nor to a pressure source since it is not necessary to control the pressure in the fluid cushion as is the case in the known prior art press rollers. Thus, the fluid cushions are unyielding, i.e., at least substantially rigid and cannot be influenced from the outside.

A further important characteristic of the invention resides in the fact that the fluid cushion or cushions are deliberately arranged at a position where the oscillation amplitude of the bending oscillation of the cross head is the greatest. These points have to be ascertained for each individual case, i.e. the disposition or form of the bending oscillation must be identified by checking the number of node points.

The fluid pressure prevailing in the fluid cushions is substantially the same as the fluid pressure prevailing in the pressure chamber (or in the opposite part of the annular chamber). This pressure is varied from time to time, thus changing the bowing of the cross head. When the distance between the cross head and the roller casing is increased, for example at the site of a piston, then the volume of the fluid cushion is inevitably increased. This arises in the case when an annular piston is used, in that fluid passes out of the surrounding area at the contact surface between the annular piston and the roller casing and then into the inside of the annular piston. In the opposite case, fluid flows out of the fluid cushion in the reverse direction, back into the annular chamber. In the latter case, there is a danger that overpressure might build up in the fluid cushion. It is therefore expedient to provide a safety overflow valve in the cross head which connects the fluid cushion with the annular chamber when a specific pressure limit is exceeded. Under certain circumstances, an additional overflow valve may also be provided for the reverse flow direction.

It will be appreciated that the oscillation eliminating effect, or at least the oscillation damping effect of the fluid cushions according to the present invention depends essentially on their being free from air pockets. In order to ensure this, fine bore air venting tubes may be provided. In addition, the volume of the inner chamber in the annular piston, which is to be filled with fluid, may be initially reduced.

The safety overflow valve above described also makes it possible for the diameter of the annular piston to be made substantially smaller than in the known press rollers. In other words, the area of the fluid cushion which is effected on the roller casing may be relatively small, if this area is at least generally circular in dimension. A preferred ratio between the effective surface of the fluid cushion and the cross sectional area of the cross head is approximately 1:20. This means that the cut-out provided in the cross head for each annular piston can also be kept small so that weakening of the cross head remains within narrow bounds.

A piston shaped in the form of a beam or bar extending parallel to the axis (x) of the roller is particularly suitable for arranging the fluid cushion in the middle of the press roller, since it is particularly important to weaken the cross-section of the cross head as little as possible at that point. Furthermore, the provision of a fluid cushion at this location can be particularly effective since, under certain circumstances, the amplitude of the bending oscillations of the cross head relative to the roller casing is greatest in the center of the roller.

It is known to provide hydraulic oscillation dampers to dampen or to eliminate oscillations. Known devices of this kind have two chambers, and fluid flows or is forced back and forth between these chambers via a throttle point. On the other hand, with the construction of the present invention, only one single chamber has to be additionally created since this can be arranged inside the large annular chamber which is always filled with fluid. Furthermore, the construction according to the present invention differs from the known oscillation dampers in that the fluid chamber formed (i.e., the inside of the annular piston) can preferably be open to the inner surface of the roller casing. This enables the sliding friction losses (between the annular piston and the roller casing) to be kept relatively small. As it is also to be anticipated that disturbing oscillations (which display a high frequency, in the magnitude of 100 Hz) will be entirely eliminated, (with the pressure remaining the same in the relevant part of the annular chamber), no significant exchange of fluid will take place between the fluid cushion and the annular chamber.

BRIEF DESCRIPTION OF THE DRAWINGS

The foregoing and still other objects and advantages of the present invention will be more apparent from the following detailed explanation of the preferred embodiments of the invention in connection with the accompanying drawings wherein:

FIG. 1 is a longitudinal sectional view of the press roller of the present invention with adjustable bowing means under load and with an associated counter-roller;

FIG. 2 is an enlarged partial sectional view taken along line II—II of FIG. 1;

FIG. 3 illustrates a particular detail from FIG. 2 when viewed in the direction of arrow III of FIG. 2; and FIG. 4 is a partial sectional view taken along line IV—IV of FIG. 1.

DETAILED DESCRIPTION OF THE PREFERRED EMBODIMENTS

The press roller with adjustable bowing under load, which is designated by reference numeral 10, is illustrated in FIG. 1. Press roller 10 includes a tubular roller casing 11 through which a stationary bowing support (cross head 12) extends. The roller casing 11 and a counter-roller 9 form, between them, a pressing nip through which a felt belt 8 travels, together with a web of paper (not shown) from which water is to be removed. The pressing plane of the press roller 10 is designated by reference letter "e" as shown in FIG. 2.

The cross head 12 rests with each of its two ends mounted in a supporting mounting 14 via a ball race 13. Although not shown in the drawings, the bearings of the counter-roller are rigidly mounted in a machine frame and the press roller 10 can be pressed against the counter-roller 9 by pivoting or displacing the supporting mountings 14.

With the aid of roller bearings 15, the roller casing 11 is rotatably mounted on the cross head 12. In the example shown, the distance W between the bearing centers of the roller casing bearings 15 is less than the distance J between the bearing J between the bearing centers of the cross head bearings 13. The oscillation problems which are eliminated by the invention have arisen primarily in press roller of this design. However, the invention can also be used for press rollers of other designs, i.e., in those where the distances W and J between the bearings are substantially the same.

The annular space between the roller casing 11 and the cross head 12 is divided in a known way into two semicircular chambers by means of longitudinal seals (not shown), namely, into a pressure chamber 16 nearest the counter-roller 9 and a so-called leakage chamber 17 lying opposite thereto. Although not shown in the drawings, the pressure chamber 16 is supplied with pressure medium from the outside through the cross head 12 and the leakage chamber 17 is held substantially at atmospheric pressure by a venting line which passes to the outside.

As shown in FIG. 1 by a sinusoidal line "S", the cross head 12 can carry out a bending oscillation with a one-third disposition, i.e., the sinusoidal line S divides the distance J between the cross head bearings into three equal sections. Since, as already described, the roller casing 11 is supported by its bearings 15 on the cross head 12, the roller casing 11 is forced by the bending oscillation of the cross head to effect a translatory oscillation (transverse to the roller axis) with the amplitude a. The amount of the amplitude a is the distance between the axis x of the press roller and the node point where the sinusoidal line S is intersected by the center line of the bearing 15. It will be seen that the amplitude of the bending oscillation of the cross head 12 relative to the roller casing 11 in the center of the press roller, i.e., in the central plane y, is substantially greater than in the outer thirds of the sinusoidal line. The amplitude which occurs in the center is designated by the reference letter "b" in FIG. 1 and the amplitude which occurs in the edge zones at a distance J/6 from the center of the cross head bearings 13 is designated by reference letter "c".

In the example illustrated in the drawings, for damping or eliminating the described bending oscillation, an annular piston 20 with a circular cross-section is arranged at each of the points where the last-named amplitude c occurs, and, in addition, there is a beam-shaped piston 40 in the vicinity of the center of the roller. These pistons 20 and 40 are described hereinafter with reference to FIGS. 2 and 4. However, it should be noted that oscillation can be suppressed by the annular pistons 20 on their own or by the beam shaped piston 40 on its own.

In FIG. 1, the pistons 20 and 40 are disposed in the regions of the pressure chamber 16. Instead of this, or in addition thereto, such pistons can also be provided in the leakage chamber 17 which lies opposite thereto. A group of at least two annular pistons can also be provided instead of a single annular piston 20.

It can be seen from FIGS. 2 and 3 that the cross head 12 has a circular cylindrical recess 21 for receiving the annular piston 20. A filling piece 22 which fills the greater part of the inner space of the annular piston 20 rests on the base of this recess. Between the filling piece 22 and the annular piston 20, a compression spring 23 is braced, pressing the annular piston 20 constantly against the inner surface of the roller casing 11. The end surface 24 of the annular piston 20 is adapted to the shape of the roller casing in order to achieve the best possible sealing effect. However, it may be necessary to provide fine grooves 25 in the end surface 24 for the purpose of conducting away air bubbles. The annular piston 20 has a sealing ring 26 on its external surface for guiding it in the recess 21 of the cross head 12. This ring is shaped so that the annular piston 20 can incline relative to the cross head 12 during the normal bowing of the cross head 12. As a modification of this design, and styled after the design illustrated in DE-PS No. 30 11 669, a sealing ring can also be arranged between the filling piece 22 and the inner surface of the annular piston.

A stepped duct 27, 27' is provided and extends through the center of the filler piece 22. In this duct, a ball valve body 28 and a compression spring 29 are arranged to form a safety overflow valve. The central channel 27' is connected to the pressure chamber 16 via transverse channels 30 and 31. The transverse channels 30 are grooves which are machined into the base surface of the filler piece 22. The transverse channels 31, on the other hand, are bores which extend through the cross head 12.

When the press roller is in operation, the above-described bending oscillation of the cross head is suppressed, at least to a very large extent, by the fluid enclosed in the inner chamber 39 in the annular piston 20.

The necessity of removing the air from the inner chamber 39 has already been discussed. If, owing to the installation circumstances of the press roller 10, the annular piston 20 is located above the roller axis, the grooves 25 mentioned above can be provided for this purpose and, optionally, additional venting ducts, i.e., at 32. For the opposite case, when the annular piston 20 lies beneath the roller axis, fine bore venting tubes 33 can be provided in the base of the filler piece 22, opening into the transverse channels 30. By way of example, the rotation direction of the roller casing 11 is indicated in FIG. 2 by arrow 7 and a circulation flow which is set up in the pressure chamber 16 is shown by arrows 34 and 35. This induces a constant cross flow in the transverse channels 30, 31 (see arrows 36), which conduct away any air bubbles which may possibly arrive in the channels 30.

For the beam shaped piston 40 which can be seen in FIG. 4 and which, when viewed in cross-section, has substantially smaller dimensions than the annular piston 20, a component corresponding to the filler piece 22 in FIG. 2 is not required. The piston 40 rests via a rectangular end surface 41 on the inner surface of the roller casing. In order to ensure proper guiding and alignment against the latter, individual finger type extensions 42 can be provided at the head of the piston 40 extending in the circumfrential direction of the roller casing 11. The whole piston 40 could be constructed as a rectangular ring. In the drawings, however, it is constructed substantially solid. In the end surface which rests against the roller casing 11, there is an elongated recess 43. This is connected to the cross head recess 45 by two stepped ducts 44, 44' which are as wide as possible. A seal provided between the cross head and the piston is designated by reference numeral 46 and, similarly, a compression spring is designated by reference numeral 47, a transverse channel is designated by reference numeral 48 and fine bore venting tubes by reference numeral 49. There is a safety valve which corresponds to the safety valve 28 in FIG. 2 although this is not visible in FIG. 4. When a specific over-pressure is exceeded in the recess 45, this valve connects the latter with the transverse bore 48 or directly with the pressure chamber 16.

Having thus described the invention with particular reference to the preferred forms thereof, it will be obvious that various changes and modifications may be made therein without departing from the spirit and scope of the invention as defined by the appended claims.

We claim:

1. A press roller of the type which co-acts with a counter roller and permits adjustable bowing under load, said press roller including:
 a bowing support which extends through a hollow, rotatable roller casing and which rests on cross head bearings in at least one support mounting; and
 at least one fluid chamber provided in a fluid filled annular chamber situated between the bowing support and the roller casing, said fluid chamber being divided from the annular chamber by a piston which rests against the roller casing and is movable relative to the bowing support, wherein the bowing support is free from any pipelines connecting the fluid chamber to the area outside the press roller so that a substantially isolated fluid cushion is situated in the fluid chamber.

2. The press roller of claim 1 wherein said bowing support is a cross head.

3. The press roller of claim 2 wherein a plurality of fluid chambers are provided divided off from the annular chamber and wherein the cross head is free from any pipelines interconnecting said plurality of fluid chambers so that the fluid cushions situated in the fluid chambers are isolated from one another.

4. The press roller of claim 3 wherein the ends of the roller casing are supported on the cross head by means of casing bearings and wherein the distance (W) between the casing bearings is less than the distance (J) between the cross head bearings and wherein said at least one isolated fluid cushion is arranged at each end of the roller at a distance (J/6) from each cross head bearing which corresponds to approximately one sixth of the distance (J) between the cross head bearings.

5. The press roller of claim 2 wherein each fluid chamber is connected in its upper region to the annular chamber by a venting tube.

6. The press roller of claim 5 wherein said venting tube is a fine-bore tube.

7. The press roller of claim 5 wherein a transverse bore is provided which extends through the cross head in the vicinity of the fluid chamber and wherein said venting tube opens into said transverse bore.

8. The press roller of claim 2 wherein said piston which rests against the roller casing is an annular piston inside which the fluid chamber is located.

9. The press roller of claim 8 wherein the cross head has a component which fills at least substantial parts of the inner chamber enclosed by the annular piston.

10. The press roller of claim 1 wherein said supporting mountings are stationary.

11. The press roller of claim 1 wherein said support mountings are movable.

12. The press roller of claim 1 wherein said at least one fluid chamber is situated in the vicinity of the pressing plane of the press roller.

13. The press roller of claim 1 wherein the isolated fluid cushion is arranged in the center (Y) of the press roller.

14. The press roller of claim 1 wherein a safety overflow valve is further provided for each fluid chamber and connects the fluid cushion with the annular chamber only when a specific overflow pressure is exceeded.

15. The press roller of claim 1 wherein the piston is a beam which extends parallel to the center axis (x) of the press roller.

16. The press roller of claim 1 wherein the piston is a bar which extends parallel to the center axis (x) of the press roller.

* * * * *